Feb. 2, 1954  H. W. TREVASKIS  2,668,035
VALVE

Filed Dec. 27, 1951  3 Sheets-Sheet 1

INVENTOR
Henry William Trevaskis
by Benj. T. Rauber
his attorney

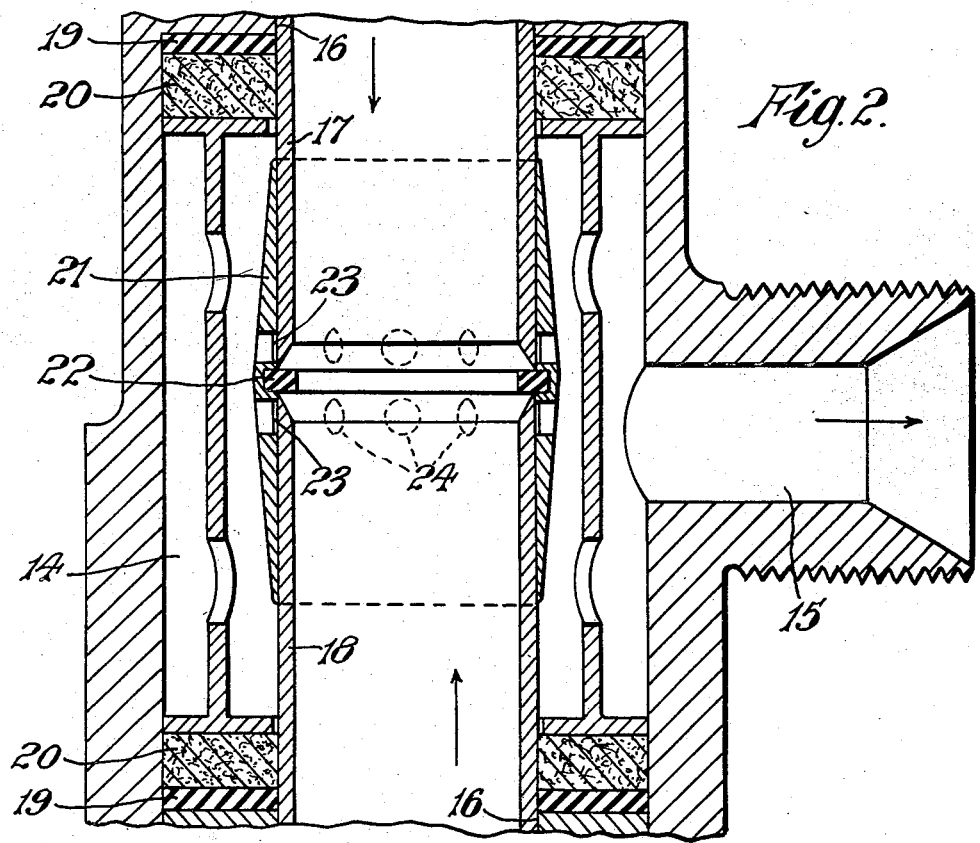

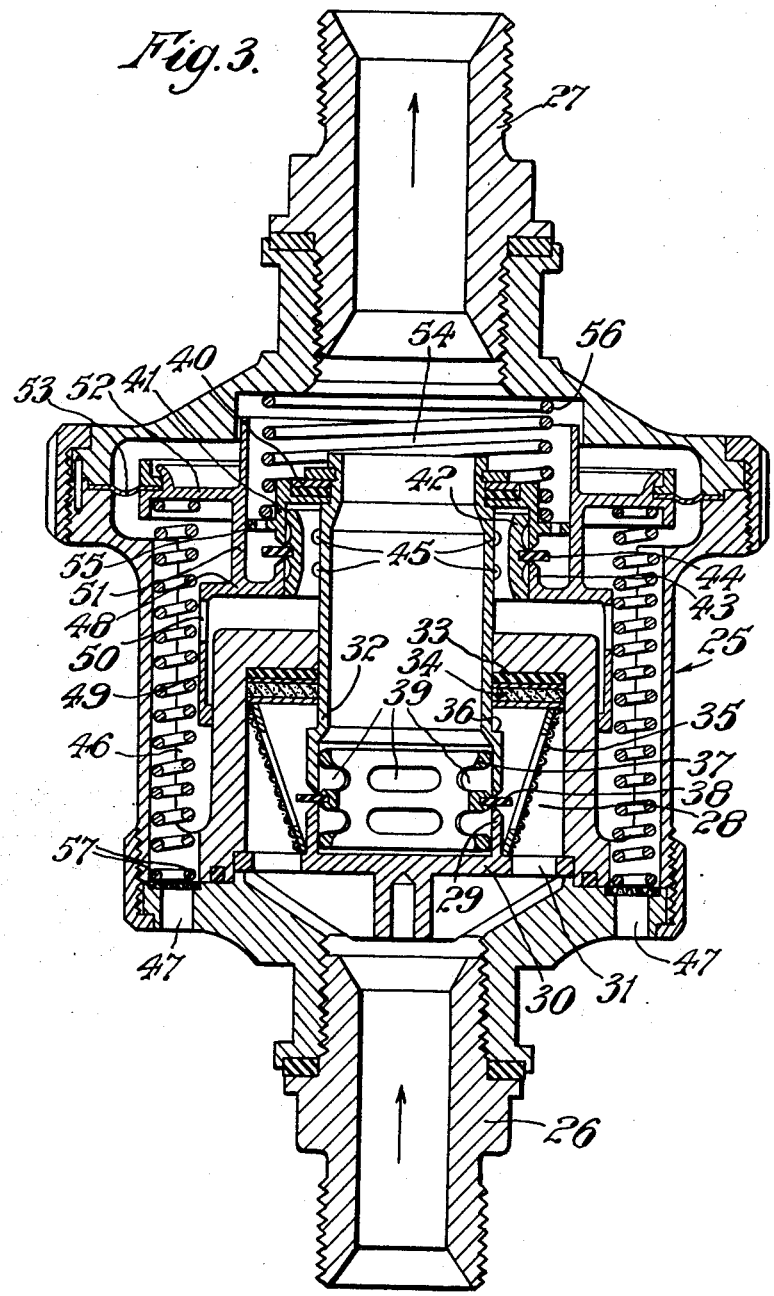

Patented Feb. 2, 1954

2,668,035

UNITED STATES PATENT OFFICE 2,668,035

VALVE

Henry William Trevaskis, Solihull, England, assignor to Dunlop Rubber Company Limited, London County, England, a British company Application December 27, 1951, Serial No. 263,615

Claims priority, application Great Britain January 2, 1951

7 Claims. (Cl. 251—78)

This invention relates to valves for the control of fluid pressure.

Pressure control units normally incorporate one or more valves, and these valves may be of various types. Preferably, however, the valves are of the direct acting type, such as poppet, ball and flap valves. In some control units these valves are held against their valve seats by the pressure from the source, and frequently a considerable initial force is required to "crack" the valve and unseat it, which is undesirable. In other types of control units the pressure from the source tends to open the valve which is held against its seating by a spring. The force of the spring to seat the valve must always exceed the force exerted by the pressure from the source to unseat it, thus ensuring a positive seating action. It frequently happens, however, particularly with pneumatic systems, that the pressure from the source varies very considerably. The force necessary to overcome the spring and unseat the valve thus varies with variations in the pressure from the source. This also is undesirable.

Direct acting valves, particularly of the poppet and flap type, normally seat on a rubber or rubber-like seating ring. The rubber is plastic, and when the valve is seated the rubber tends to flow from the area of high pressure to that of low pressure. Excessive distortion of the sealing ring is objectionable since it tends to slow down the operation of the valve and provides a less positive seating.

The object of this invention is to provide a valve for the control of fluid pressure which requires a small force only for its operation, this force remaining practically constant irrespective of variations in pressure from the source. Another object of the invention is to provide a valve which permits a controlled flow of fluid therethrough and which comprises a seating ring which is not greatly distorted under pressure. Yet another object of the invention is to provide a fluid pressure control unit which incorporates valves of the preferred type.

According to the invention a valve for the control of fluid pressure comprises a fluid-tight chamber having a connection for pressure fluid, two co-axial tubular valve members at least one thereof being slidable in a wall of the chamber, a sleeve co-axial with and slidable relative to the valve members, said sleeve overlapping the adjacent ends of the members, an annular seating ring for the said ends carried by the sleeve, axially spaced fluid passages in the sleeve on opposite sides of the ring and means for moving at least one of the valve members axially towards and away from the ring.

Preferably the fluid-tight chamber is adapted to be connected to a source of fluid pressure and the adjacent ends of the tubular valve members are chamfered to provide a more fluid-tight contact with the seating ring which is preferably of a rubber or rubber-like composition. The valve members may be chamfered at either their inner or outer peripheries, but when chamfered at their outer peripheries are preferably provided with an inwardly extending annular step, the change in diameter taking place within the pressure chamber.

In one form of the invention both valve members are slidably fitted through holes in opposite ends of a chamber which is adapted to be connected to a source of fluid pressure, and the adjacent ends of the members are chamfered, the chamfered portions being on the outer peripheries of the members. A cylindrical sleeve is slidably fitted within the larger diameter parts of the tubular members and an annular seating ring extends outwardly from said sleeve and forms a fluid-tight seating for the adjacent chamfered ends of the valve members. The sleeve is provided with a plurality of holes extending radially therethrough on both sides of the seating ring. The chamfered end of each valve member is of larger diameter than the end slidably passing through the hole in the chamber, the change in diameter taking place within the pressure chamber and forming an outwardly extending annular step. The outside diameter of the smaller part of the valve member is equal to the inside diameter of the larger part of each valve member and the axially projected area of said annular step equals and balances the axially projected area of said chamfered end. Thus when the valve is closed and the chamber pressurized the force exerted by said pressure and acting on the step of the valve member in one axial direction is balanced by the axial component of the force acting on the chamfered end of the valve member in the other axial direction. The force required to open the valve is thus only that force required to overcome the frictional resistance of one or both slidable valve members.

In another form of the construction the adjacent ends of the tubular valve members are chamfered at the inner periphery thereof and the valve members are not stepped to two diameters, as hereinabove described, but have a uniform diameter and extend fluid-tightly through opposite walls of the fluid-tight chamber. The sleeve is slidable on the outer periphery of the tubular members and an annular seating ring extends inwardly therefrom to form a fluid-tight seating for the adjacent ends of the valve members. As in the previous example a plurality of holes extend through the sleeve for the passage of pressure fluid, but in this case the tubular valve members are connected to a source of fluid pressure and the chamber to a mechanism to be operated.

In order that the invention may be more fully described, reference is made to the accompanying drawings, wherein:

Figure 2 shows a sectional arrangement of another form of valve construction,

Figure 3 shows a pressure reducing mechanism incorporating valves of the preferred type.

Figure 1:
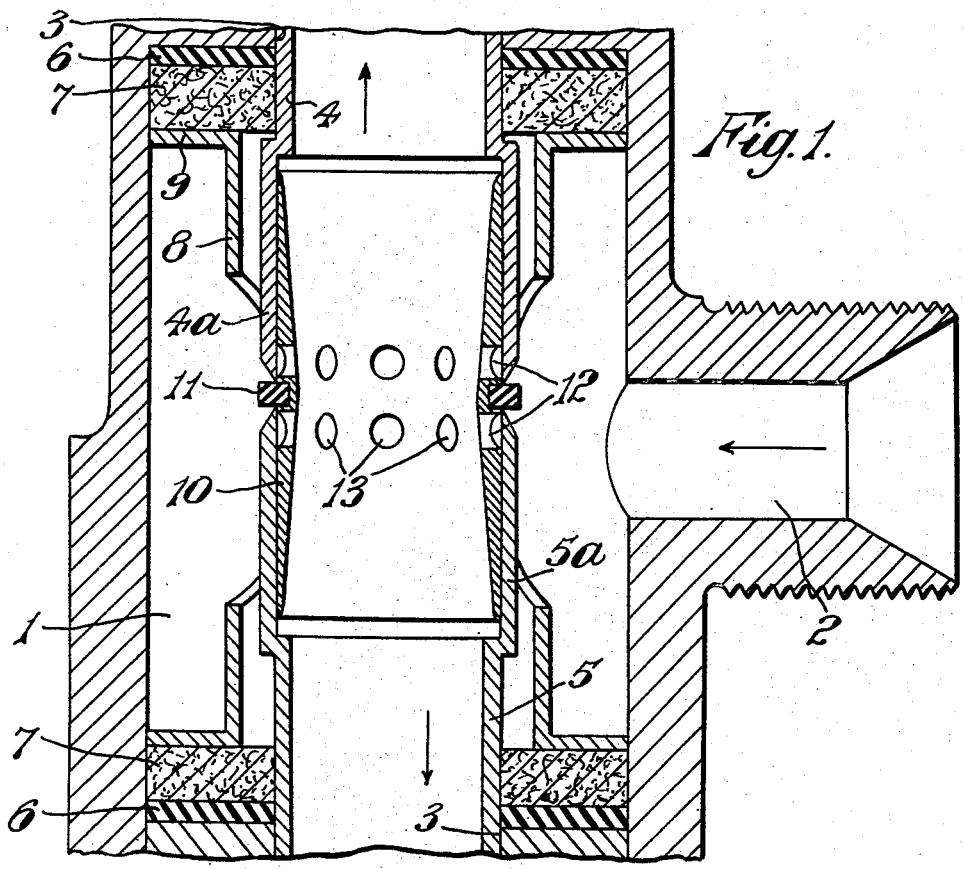
Figure 1 shows a sectional arrangement of one form of valve construction.

In one embodiment of the present invention (Fig. 1) a valve comprises a cylindrical pressure-tight chamber 1 provided at a location between its ends with a conduit 2 to communicate with a source of pneumatic pressure. A hole 3 is provided centrally through each end of the chamber and tubular valve members 4 and 5 are slidably fitted through each of said holes. The holes and valve members are co-axially aligned and the walls of the tubular valve members are of uniform thickness. Each valve member is provided, within the cylindrical chamber, with a larger diameter portion 4a, 5a the radial width of the step so formed being equal to the thickness of said wall. A sealing ring 6 is fitted against each end of the cylindrical chamber to prevent leakage of pressure fluid along the interface between the outer periphery of the valve member and the hole through which it passes. An impregnated felt lubricating washer 7 is fitted against each sealing ring. The two rings at each end of the housing are held in position by a spacing member comprising a tubular portion 8 of larger diameter than the valve members and co-axial therewith and an annular flange portion 9 extending radially outwardly from each end thereof, said flange portions abutting the lubricating washers and holding them, together with the sealing rings, against their respective ends of the chamber. The spacing member is provided with diametrically opposed radially extending holes and a sleeve of metal gauze or other similar filtering material (not illustrated) may be fitted over the tubular portion of the spacing member to prevent foreign matter from entering the valve.

An annular sleeve 10 is slidably fitted within the larger diameter parts of the tubular valve members, a portion of the sleeve being slidable in each valve member. The thickness of the wall of said sleeve is kept as low as permissible in order to obtain the largest possible flow through the bore of the sleeve. An annular groove of rectangular section is provided around the periphery of the sleeve midway between its ends and an annular rubber seating ring 11 of rectangular cross-section is fitted in said groove and extends radially outwards therefrom. The outer periphery of the sleeve is provided with two grooves 12 of part-circular section, one on each side of the ring and adjacent thereto, and from the bottom of said grooves a plurality of holes 13 lead into the bore of the sleeve. The adjacent ends of the two tubular valve members are chamfered to a knife edge, said knife-edge portions being at the inner periphery of the valve members, and are adapted to seat one on each side of the seating ring.

The valve is closed by moving one or both tubular valve members towards the other, when the annular knife-edges will seat one on each side of the seating ring and thus prevent the flow of pneumatic pressure from the source, through the holes in the sleeve and into the tubular valve members.

With the valve closed, the two annular knife-edges seating on the seating ring are spaced from the outer periphery of the sleeve only by the very small clearance between the outer periphery of the sleeve and the inner periphery of the valve members. The flow of rubber of the seating ring is thus very restricted.

Each of the valve members is "balanced" when the valve is in a closed position, i. e. the force exerted by the pressure from the source and acting on the step of the valve member in one axial direction is balanced by the axial component of the force acting on the chamfered end of the valve member in the other direction. The force required to open the valve is thus only that force required to overcome the frictional resistance of one or both slidable valve members, and this force remains very small irrespective of pressure changes from the source.

To open the valve one or both valve members are slid axially and one or both annular knife-edges quit the seating ring and expose the holes in the sleeve. Pneumatic pressure from the source thereupon flows through said holes and into the valve members.

In another embodiment of the invention (Fig. 2) a valve is provided which is similar to that hereinabove described. It comprises a cylindrical fluid-tight operating chamber 14 provided at a location between its ends with a conduit 15 adapted to deliver fluid under pressure. A hole 16 is provided centrally through each end of the chamber and cylindrical tubular valve members 17 and 18 are slidably fitted through each of said holes. The holes and valve members are co-axially aligned and the walls of the tubular valve members are of uniform thickness. A sealing ring 19 is fitted against each end of the end walls of the chamber, interior of the chamber, to prevent leakage of pressure fluid along the interface between the outer periphery of the valve member and the hole through which it passes. An impregnated felt lubricating washer 20 is fitted against each sealing ring. The adjacent ends of the two valve members are chamfered to an annular knife-edge, the chamfered portions being at the inner periphery of the valve members.

The adjacent ends of the two valve members are both slidable within a cylindrical sleeve 21, the end of each valve member being slidable within a portion of the sleeve. An annular groove of rectangular section is provided around the inner periphery of the sleeve midway between its ends, and an annular rubber sealing ring 22 of rectangular cross-section is fitted in said groove and extends radially inwards therefrom. The inner periphery of the sleeve is provided with two shallow grooves 23 of rectangular section, one on each side of the ring and adjacent thereto, and from the bottom of said grooves a plurality of holes 24 lead into the chamber. The annular knife-edge portions at the adjacent ends of the valve members are adapted to seat one on each side of the seating ring.

The ends of the two valve members remote from the seating ring project into and communicate with a pressure chamber which is adapted to be connected to a source of fluid pressure.

The valve is opened by moving one or both tubular valve members away from the other, thus exposing the holes in the sleeve and allowing the pressure fluid to flow therethrough into the operating chamber 14 and thence, e. g. into a mechanism to be operated. Similarly the valve is closed by moving one or both tubular valve members towards the other, when the annular knife-edges will seat one on each side of the seating ring and thus prevent the flow of pressure fluid through the sleeve.

One or both valve members may be arranged to communicate with a mechanism to be operated, as in the first embodiment of the invention or with a source of fluid pressure, as in the second embodiment of the invention. Means are provided for slidably moving one or both valve members towards or away from one another and said means may comprise, e. g. a flexible cable, a lever mechanism, an electrically operated solenoid or a piston and cylinder mechanism.

A valve constructed as herein described may be incorporated in a great variety of fluid pressure control units. By way of example, a pneumatic reducing unit is described incorporating valves of the above type.

This unit, which is illustrated in Figure 3, comprises a closed cylindrical housing 25, having an inlet connection 26 centrally positioned at one end thereof and an outlet connection 27 centrally positioned at the other end. The inlet connection communicates with a pressure chamber 28 located co-axially within the housing at the end thereof adjacent the inlet connection.

A flanged tubular valve member is securely fitted in the end of the pressure chamber adjacent the inlet connection. Said member comprises a tubular valve member 29 extending co-axially from one face of a circular flange 30, the periphery thereof being contained in an annular groove formed in the wall of the pressure chamber. The flange is provided, adjacent its outer periphery, with a plurality of holes 31 for the passage of pressure fluid. One end of the tubular member is thus closed and the other end open and the open end is chamfered at the outer periphery, i. e. the annular knife-edge is located at the inner periphery.

Another tubular valve member 32 is slidably and co-axially fitted through a hole in the wall of the pressure chamber remote from the inlet connection, and said valve member extends across the housing to a location adjacent the outlet connection. An annular sealing ring 33 and lubricating ring 34 are fitted against said pressure chamber wall and prevent leakage of air under pressure between the valve member and the said hole and also lubricate said valve member. Said washers are held in position by a filter member 35 of frusto-conical shape which has one end abutting said washers and the other end abutting said flange 30.

The end of the valve member 32 within the pressure chamber is likewise chamfered at its outer periphery to provide an annular knife-edge at its inner periphery. The chamfered end of this valve member is of larger diameter than the part slidably passing through the hole in the pressure chamber, the change in diameter taking place within the pressure chamber and forming an outwardly-extending annular step 36. The outside diameter of the smaller diameter part of said valve member is equal to the inside diameter of the larger diameter part. The inside and outside diameters of the adjacent ends of the two valve members are equal.

A sleeve 37 is slidably fitted within the adjacent ends of the two valve members, a part of said sleeve being slidable in one member and the other part slidable in the adjacent member. The sleeve is provided at its outer periphery and midway between its ends, with an annular groove in which is seated an annular resilient seating ring 38, which extends radially outwardly from said groove and forms a seating for the adjacent chamfered ends of the two tubular valve members. Holes 39 located on each side of the seating ring allow the passage of pressure fluid through the sleeve. The two tubular valve members 29 and 32, together with the sleeve and seating ring, comprise an inlet valve.

The end of the tubular member 32 adjacent the outlet connection has secured thereto in pressure-tight manner an annular flange 40 extending radially outwardly therefrom and from the outer periphery of the flange a tubular valve member 41 extends axially away from the outlet connection. The end of the valve member is chamfered in the manner previously described. A sleeve 42 has one end slidable in said valve member 40 and the other end slidable in another tubular valve member 43, which also has one end chamfered. The sleeve is provided with an outwardly-extending seating ring 44 to co-operate with the adjacent chamfered ends of the two tubular valve members and radially-extending holes 45 for the passage of pressure fluid. The two tubular valve members 41 and 43, together with their associated sleeve and seating ring, constitute a relief valve.

An outer annular chamber 46 is formed between the outer wall of the housing 25 and the co-axial wall of the pressure chamber 28, and said annular chamber forms part of a relief chamber which communicates with atmosphere through holes 47 located adjacent the inlet connection.

The end of the tubular valve member 43 remote from the seating ring is provided with an outwardly-extending radial flange 48 from the outer periphery of which a cylindrical guide member 49 extends axially and slidably fits the outside of the peripheral wall of the pressure chamber 28. Holes 50 are provided through said member to allow communication between the interior of the relief valve sleeve 42 and the annular chamber 46. From said flange 48 a cylindrical member 51 extends axially to a location adjacent the outlet connection end of the housing and midway between the ends of said member 51 an outwardly-extending annular flange 52 extends radially to a location adjacent the peripheral wall of the housing. A flexible annular diaphragm 53 is provided, the outer periphery of which is nipped between two parts of the housing wall and the inner periphery of which is nipped between two parts of the flange 52 at the outer periphery thereof. The part of the housing on the side of the flange 52 adjacent the outlet connection comprises the operating chamber 54 of the mechanism.

The tubular valve member 41 is provided adjacent its chamfered end with an outwardly-extending flange 55 which slidably fits in the cylindrical member 51, and said flange is provided with a plurality of holes for the passage of pressure fluid. A helical spring 56 is interposed between said flange and the adjacent end of the housing and a plurality of helically wound springs 57 are fitted in the annular chamber 46 of the relief chamber, and have one end abutting the flange 52 and the other end abutting the end of said annular chamber provided with the holes 47. In the inoperative position of the mechanism the spring 56 forces the tubular valve member 41 in one direction to seat on the ring 44 and the valve member 43 is forced in the opposite direction by the springs 57 to seat on the other side of the ring. The relief valve is thus closed. The springs 57 are so rated that they exert a greater force than spring 56 and in the opposite direction and thus the whole relief valve is moved bodily towards the outlet connection. The valve member 32 of the inlet valve is secured to the valve member 41 of the relief valve and thus movement of the relief valve in this direction opens the inlet valve.

The operation of the pressure reducing mechanism, when the inlet connection is connected to the upstream side of a pneumatic pressure line and the outlet connection is connected to the downstream side, is as follows. Air under pressure flows through the inlet connection into the pressure chamber, through the open inlet valve and tubular valve member into the operating chamber and thence through the outlet connection. The pressure in the operating chamber mounts up and, acting on the flange 52 and other parts associated with the valve member 43 of the relief valve, forces said valve member against the springs 57 in a direction away from the outlet connection. The other valve member 41 of the relief valve is spring-loaded to follow the movement of valve member 43, thus maintaining the relief valve shut. The inlet valve member 32 is secured to relief valve member 41 and hence movement of valve member 41 in a direction away from the outlet connection will close the inlet valve and prevent the further flow of air under pressure through the mechanism when a predetermined outlet pressure has been attained. When the pressure in the operating chamber drops below said predetermined value the springs 57 will move the relief valve bodily towards the outlet connection, thus re-opening the inlet valve in the manner hereinabove described.

It is possible for the pressure in the operating chamber to exceed the predetermined value, due, e. g. to the effects of heat. The inlet valve will be shut and excess pressure, acting on the flange 52 and parts associated with the relief valve member 43 will move said flange against the force of the springs. Relief valve member 41 will not move since it is secured to inlet valve member 32 which is seated. Relief valve member 43 thus moves away from the seating ring and excess pressure flows therethrough, into the relief chamber 43, through the holes 47 to atmosphere.

A pressure control unit similar to the above is also suitable for controlling hydraulic pressure.

Having described my invention, what I claim is:

1. A valve for the control of fluid pressure which comprises a fluid-tight chamber having a connection for pressure fluid, two co-axial tubular valve members at least one thereof being slidable in a wall of the chamber, a sleeve co-axial with and slidable relative to the valve members, said sleeve overlapping the adjacent ends of the members, an annular seating ring for the said ends carried by the sleeve, axially spaced fluid passages in the sleeve on opposite sides of the ring and means for moving at least one of the valve members axially towards and away from the ring.

2. A valve according to claim 1 wherein the adjacent ends of said tubular valve members are chamfered.

3. A valve according to claim 2 wherein the adjacent ends of the tubular valve members are axially slidable within a sleeve which is provided, intermediate its ends, with an inwardly extending annular resilient ring to form a fluid-tight seating for the chamfered ends of said tubular valve members, said sleeve being provided with a plurality of holes on each side of the ring to allow the passage of pressure fluid radially therethrough.

4. A valve according to claim 3 wherein the adjacent ends of the valve members are chamfered at the inner periphery thereof.

5. A valve according to claim 2 wherein the sleeve is axially slidable in the adjacent end of the tubular valve members and is provided, intermediate its ends, with an outwardly-extending annular resilient ring to form a fluid tight seating for the chamfered ends of said tubular valve members, said sleeve being provided with a plurality of holes on each side of the ring to allow the passage of pressure fluid radially therethrough.

6. A valve according to claim 5 wherein the adjacent ends of the valve members are chamfered at the outer periphery thereof.

7. A valve according to claim 6 wherein a part of the tubular valve member within the fluid-tight chamber is stepped outwardly to a greater diameter, the area of the annular step so formed being equal to the projected area of the chamfered end in the axial direction.

HENRY WILLIAM TREVASKIS.

References Cited in the file of this patent

UNITED STATES PATENTS

| Number | Name | Date |
|---|---|---|
| 1,180,897 | Williams | Apr. 25, 1916 |
| 2,087,037 | McCarthy | July 13, 1937 |